Dec. 18, 1956 P. M. MORSE 2,774,341
ROTARY INTERNAL COMBUSTION ENGINE
Filed Nov. 22, 1954 4 Sheets-Sheet 1

Paul M. Morse
INVENTOR.

BY *Clarence A. O'Brien
and Harvey B. Jacobson*
Attorneys

Dec. 18, 1956 P. M. MORSE 2,774,341
ROTARY INTERNAL COMBUSTION ENGINE
Filed Nov. 22, 1954 4 Sheets-Sheet 3

Paul M. Morse
INVENTOR.

BY *Clarence A. O'Brien*
*and Harvey B. Jackson*
Attorneys

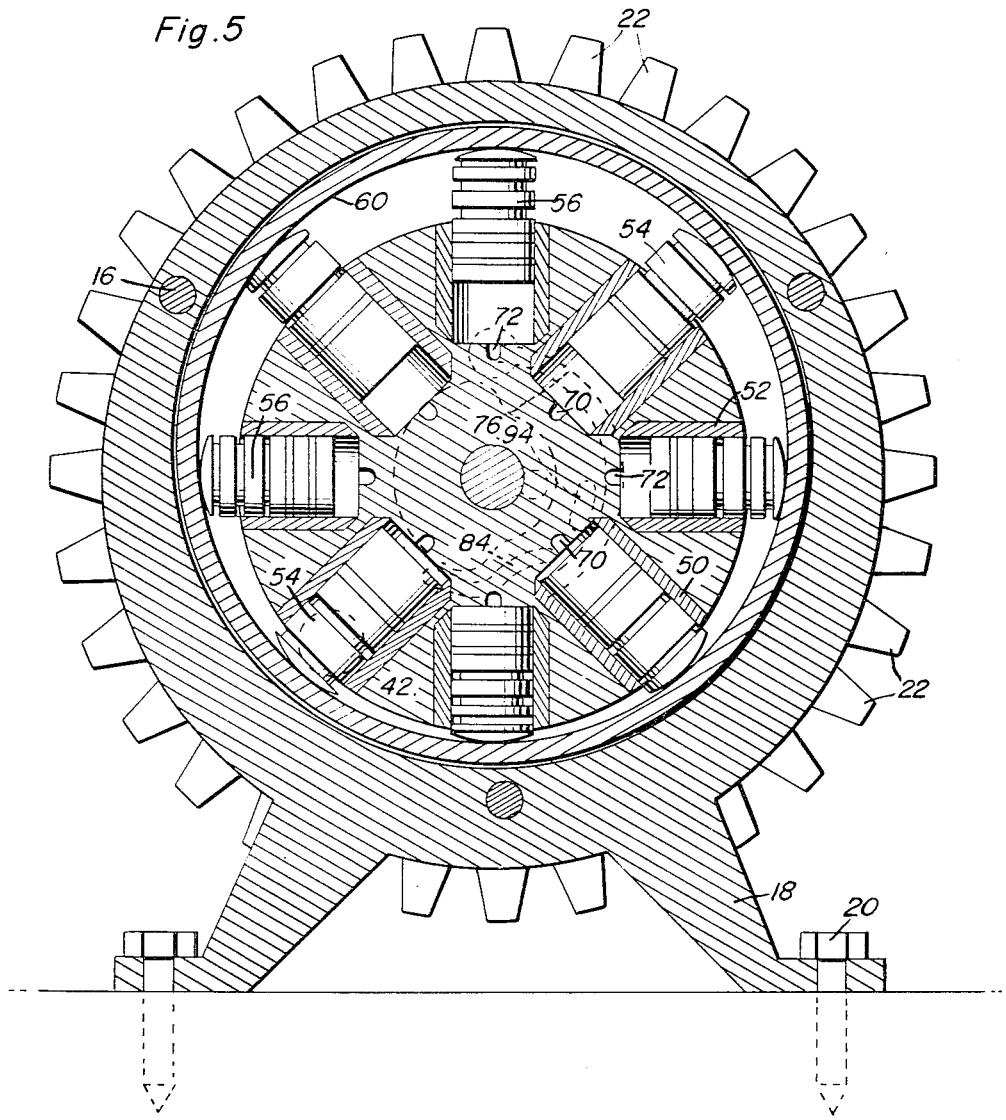

United States Patent Office 2,774,341
Patented Dec. 18, 1956

2,774,341

ROTARY INTERNAL COMBUSTION ENGINE

Paul M. Morse, Carlinville, Ill.

Application November 22, 1954, Serial No. 470,332

6 Claims. (Cl. 123—44)

This invention comprises novel and useful improvements in a rotary internal combustion engine, and especially to engines operating upon the two-cycle mode of operation and which have fuel compressing means associated therewith.

The primary object of this invention is to improve rotary internal combustion engines by substituting for the conventional connecting rods and bearings by which pistons are connected with a rotatable crankshaft, a simplified and more efficient connecting means between the pistons and the power shaft.

A further object of this invention is to provide a rotary internal combustion engine wherein pairs of compression and power cylinders are provided, one cylinder constituting a compressor cylinder for receiving a fuel mixture and delivering a compressed fuel mixture to its associated power cylinder.

A still further object of the invention is to provide an internal combustion engine wherein each power cylinder produces one power stroke during each revolution of the rotor.

Yet another object of the invention is to provide an internal combustion engine wherein a closure plate of the casing of the engine is utilized as a manifold system for conveying the various necessary fluids for the engine operation to and from the cylinders; and which will function as a replacement for and a substitute for the usual valve mechanism of an engine.

An additional object of the invention is to provide a rotary engine having improved cooling and improved lubricating means therefor.

Yet another object of the invention is to provide an internal combustion engine wherein the power output of the engine may be easily and precisely controlled by rejecting a portion of the compressed fuel mixture delivered by the compressor cylinders to the power cylinders prior to such delivery.

Yet another object of the invention is to provide in an internal combustion engine of the character above described, means whereby the rejected fuel charge shall be returned to the fuel supply and function to preheat and assist in volatilizing the fuel supply.

Yet another object of the invention is to provide an internal combustion engine wherein all electrical ignition systems are eliminated, thereby preventing any interference with radio or television reception during the operation of the engine.

A further object of the invention is to provide an internal combustion engine which may utilize solid pistons, thereby enhancing the cooling effect, and whereby the weight of the cylinders and pistons will contribute to the flywheel effect of the engine.

Still another object of the invention is to provide an internal combustion engine of the rotary type having an improved lubricating means and whereby the rotation of the engine will facilitate the conveying of the lubricant to all parts of the same while minimizing resistance of the lubricant to rotation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6:
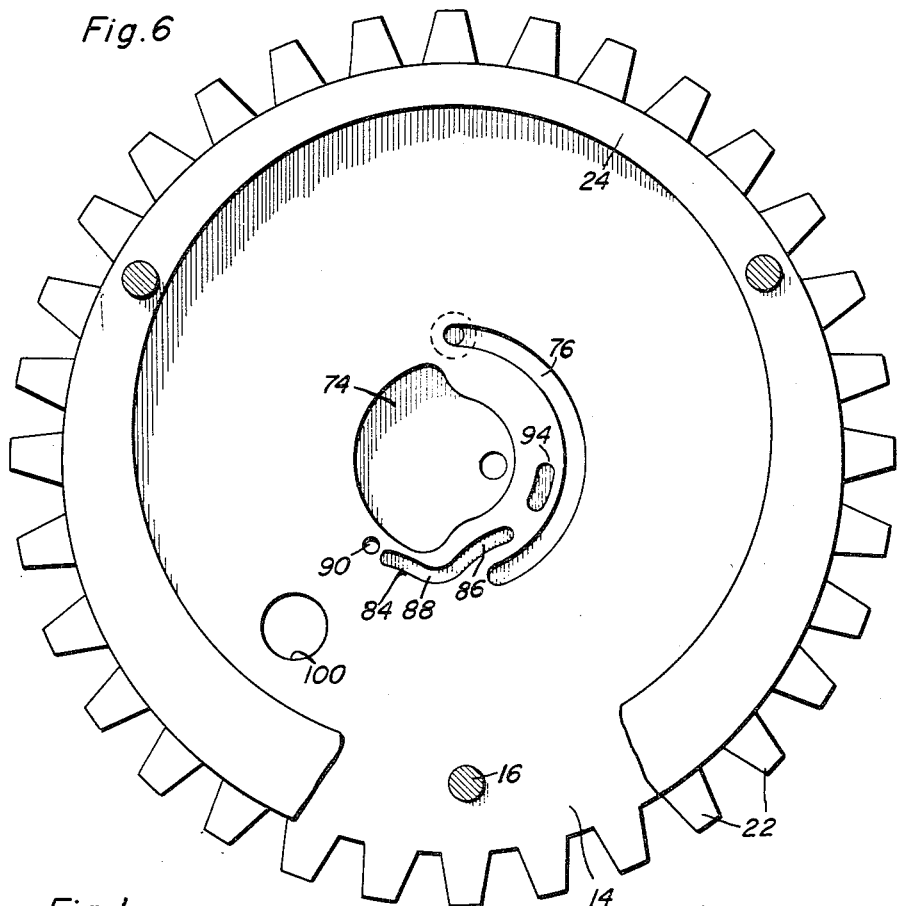
Figure 1:
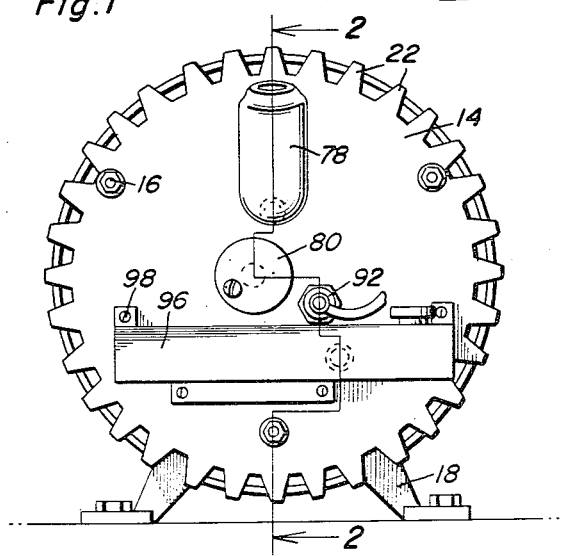
Figure 1 is an elevational view of one suitable embodiment of rotary internal combustion engine in accordance with the principles of this invention.
Figure 2:
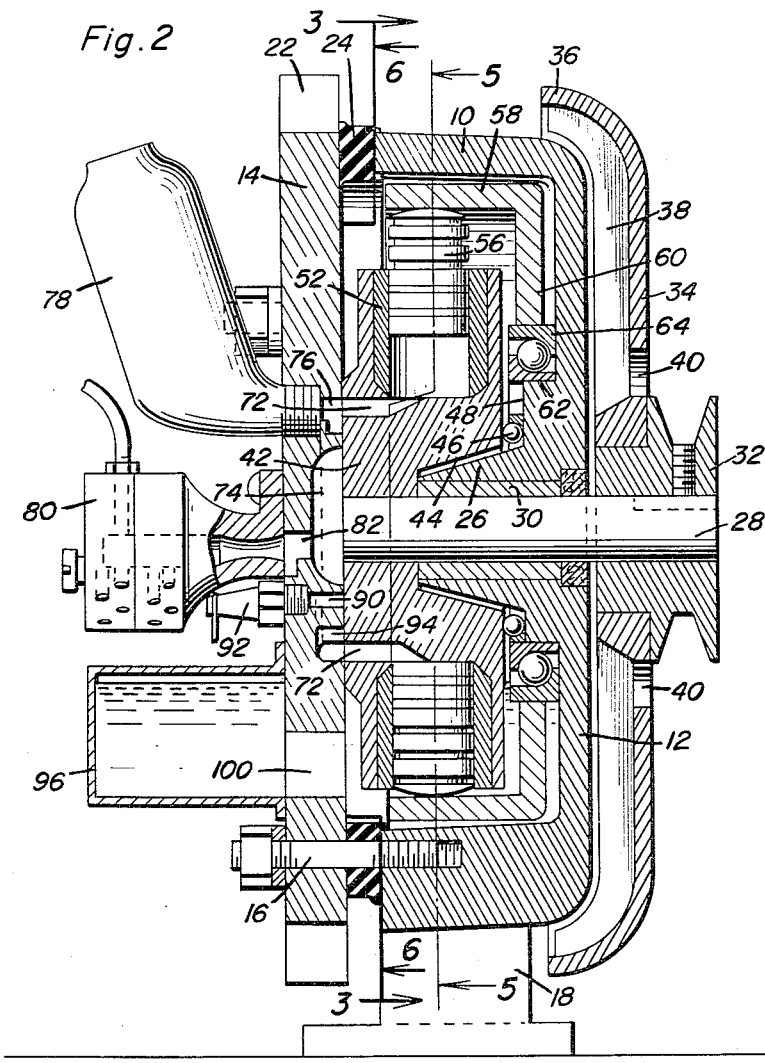
Figure 2 is a vertical transverse sectional view taken upon an enlarged scale substantially upon the plane indicated by the broken section line 2—2 of Figure 1.

Figure 5 is a vertical sectional view taken substantially upon the plane indicated by the broken section line 5—5 of Figure 2 and looking in the direction indicated by the arrows; and Figure 6 is a vertical transverse sectional view taken substantially upon the plane indicated by the section line 6—6 of Figure 2 and looking in the direction indicated by the arrows, and showing in particular the fluid passage arrangement in the closure plate of the engine.

The rotary combustion engine embodying therein the principles of this invention, as illustrated in the accompanying drawings, consists of a generally cylindrical casing 10 which has a fixed or integral end wall 12 closing one side thereof while the other open side is closed by a removable closure plate 14. The plate 14 is conveniently secured to the casing 10, as by means of fastening bolts or studs 16, whereby access may be had to the interior of the casing.

The casing may conveniently be provided with supporting legs or standards 18 which are secured to any suitable support base, as by bolts 20.

The closure plate 14 is preferably provided with a plurality of air cooling fins 22 to assist in cooling the engine, although it will be understood that the invention may employ other cooling means, if desired.

As will be observed from Figure 2, an annular sealing ring 24 which may be of rubber or other suitable material is interposed between the open end of the casing 10 and the closure plate 14, being compressed therebetween to define a fluid-tight seal, by means of the above mentioned fastening bolts 16.

Extending axially inwardly from the permanently closed end wall 12 of the casing 10 is a tubular boss 26 and a power take-off shaft 28 is journaled in this boss, as by a bearing member 30 of any desired character, this shaft extending to the exterior of the casing and being provided with a pulley 32 or other power take-off member, there also being secured to this pulley an air cooling fan consisting of a shell or disk 34 having its periphery curved as at 36 to overlie the casing 10. A plurality of radially extending vanes or ribs 38 are disposed upon the surface of the shell 34 which is adjacent the casing 10, and apertures 40 are disposed through the member 34 adjacent the hub portion of the same. In this manner, cooling air may be expelled centrifugally and radially outwardly from between the shell 34 and the wall 12 of the casing 10, while fresh air is drawn into this space through the openings 40. It will be observed that this air also, after passing across the circumference of the casing 10, will impinge upon and further cool the air cooling fins 22 previously mentioned. Thus, the entire exterior surface of the casing or housing of the engine is effectively air cooled.

A generally cylindrical rotor 42 has a central portion provided with a conical recess 44 to loosely surround the exterior of the boss 26, the rotor being fixedly secured in any desired manner to the inner portion of the power take-off shaft 28 which projects into the interior of the casing inwardly beyond the boss 26. Thus, the rotor, being fixedly secured to the power take-off shaft, is caused to rotate therewith. It will be observed that, as viewed in Figure 2, the left hand side of the rotor is constructed as a smooth flat plane which rubs against the inside surface of the closure plate 14 and has a sliding engagement therewith for a purpose to be subsequently set forth.

Thrust bearings 46 are disposed upon the boss 26 between a vertical, annular surface 48 of the same and a complementary surface on the rotor for taking up axial thrust of the rotor. By this means, the rotor is effectively journaled in the housing or casing of the engine, and is supported for rotation by the power shaft and is journaled against thrust by the thrust bearing assembly.

Figure 3:
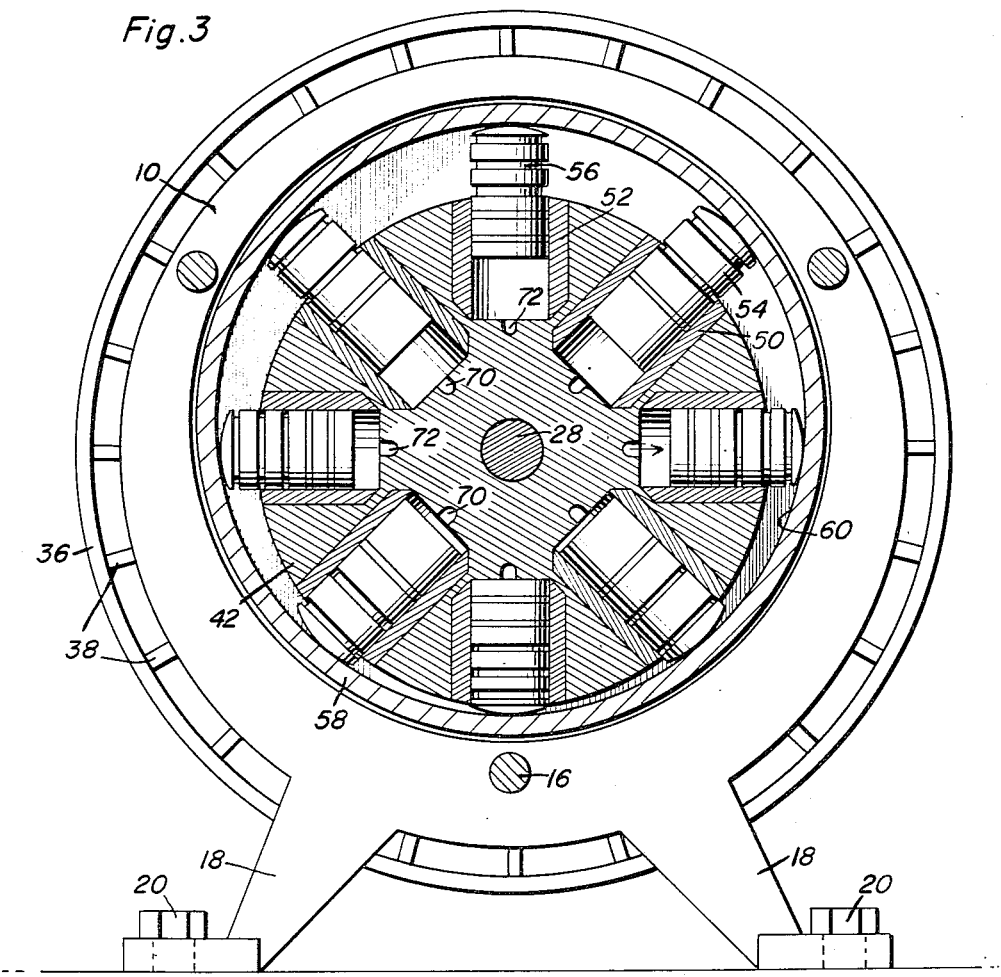
Figure 3 is a vertical transverse sectional view taken substantially upon the plane indicated by the section line 3—3 of Figure 2 and looking in the direction indicated by the arrows.
Figure 4:
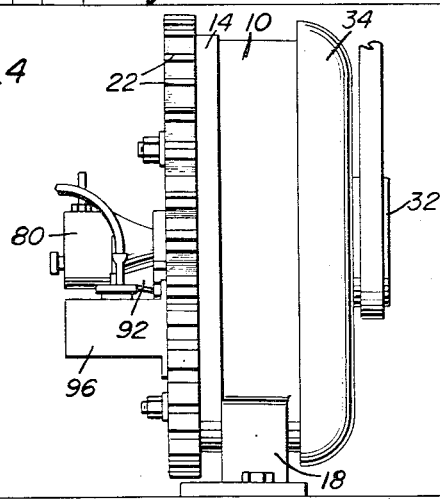
Figure 4 is an end elevational view, taken from the right end of Figure 1.

Referring now in general to Figures 2, 3 and 5 of the drawings, it will be seen that the rotor is provided with a plurality of radially disposed circumferentially spaced cylinders. Any desired number of these cylinders may be provided, eight being found convenient for purpose of illustration, it being merely necessary that the cylinders be provided in pairs, each pair consisting of a compressor cylinder 50 and a circumferentially adjacent power cylinder 52. Compressor pistons 54 and power pistons 56 are respectively slidably received in the compressor and power cylinders. Each piston is preferably a solid member, being provided with a flat face at its inner end which constitutes the working face of the piston, and provided with a curved surface at its outer end which constitutes the reaction member of the piston whereby the same is operatively connected through a connecting means with the power take-off shaft 28 for rotation by and for rotating the same.

The solid construction of the pistons secures the advantages of better heat flow from the working chamber of the power pistons and to the compression chamber of the compression pistons. In addition, since the pistons rotate with the rotor, their mass added to that of the rotor produces a very effective flywheel for the engine, whereby the customary flywheel may be omitted.

Suitable sealing or packing rings are provided for the pistons, including the provision of oil grooves thereon, as illustrated. However, since the principles of the present invention are not limited to any particular packing and sealing ring construction, a further description of the same is deemed to be unnecessary.

Referring now more specifically to Figure 2, it will be seen that a reaction member is provided for the pistons whereby the reciprocation of the pistons in the cylinders effects and is effected by rotation of the rotor including the cylinders and pistons. This reaction member consists of a reaction ring or cylindrical drum 58 which surrounds the rotor and which has a cylindrical flange 60 with an inner surface against which the rounded ends of the pistons engage. The ring 58 has the radial flange 60 which is journaled upon an annular shoulder 62 upon the boss 26 by means of an antifriction bearing assembly 64 of any desired character. It should be observed, however, that the cylindrical shoulder 62 is eccentric with respect to the axis of the power take-off shaft 28, whereby the surface of the flange 60 of the ring 58 is eccentric or is displaced from the axis of the power shaft. Consequently, as the reaction ring 58 and the rotor 42 revolve, the engagement of the pistons with the ring effects a radial reciprocation of the pistons in their cylinders to thus provide the piston strokes. It should be observed that the reaction member 58 is free to rotate, its only engagement with the rotor being through the contact of the pistons with the reaction surface of the reaction ring.

Reference is now made more specifically to the cooperating portions of the rotor and the closure plate 14 which constitute the valve assembly for the engine and which replace the various moving elements of the conventional engine valve mechanism. It will be observed that each of the cylinders is provided with a conduit which communicates the interior of the cylinder with the face of the rotor which slidingly engages the closure plate. The conduits for the power cylinders are designated by the numerals 72, while those for the compressor cylinders are indicated at 70. It should be observed that the conduits 70 lie at a different radial distance from the axis of the power shaft 28 than do the conduits 72, whereby they will register with a different portion of the closure plate.

Referring now especially to Figure 6, it will be seen that the inside surface of the closure plate is provided with a recess or depression at its central portion, as at 74, which is positioned in such manner as to register with compressor cylinder conduits 70, while the power cylinder conduits 72 are positioned radially outwardly therefrom. An arcuate passage or channel 76 is provided radially outwardly from the passage or recess 74, which is positioned for registration with the power cylinder conduits 72. From Figure 2 in particular, it will be seen that an exhaust muffler 78, mounted upon the exterior of the closure plate 14, communicates with the exhaust passage 76 whereby during the rotation of the rotor, each of the power cylinders will in turn establish communication between its exhaust conduit 72 and the exhaust passage 76 in the closure plate.

A carburetor 80 of any desired type is likewise mounted upon the closure plate, and communicates with a fuel inlet passage 82 which, in turn, delivers fuel into the fuel intake passage or recess 74. Consequently, during rotation of the rotor, the fuel delivery passages 70 of the compressor cylinders will periodically communicate with the fuel delivery passage 74 to be supplied with fuel therefrom.

In order to deliver the fuel mixture received from the carburetor and the fuel delivery or intake passage or recess 74, and compressed by the compressor cylinders, a by-pass or transfer passage 84 is provided in the closure plate. The latter includes a portion 86 which lies at the same radial distance from the axis of rotation of the rotor as do the fuel delivery conduits 70 of the compressor cylinders; while the by-pass passage 84 has a further portion 88 which lies at the same radial distance from the axis of rotation of the rotor as do the power cylinder conduits 72. The passage 84 is so shaped that it will establish communication between a compressor cylinder and the preceding power cylinder in order to transfer a compressed combustible mixture from the compressor cylinder to the power cylinder just as the compressor piston has substantially completed its compression stroke and the power piston has completed its instroke and is about to begin its working out-stroke and is ready for ignition of the combustible mixture.

Immediately after the compressed fuel mixture has been transferred from the compressor cylinder to the power cylinder, it being understood that the piston of the compressor cylinder will be moving into its compression chamber for discharging the compressed mixture therefrom at the same rate at which the power piston moves outwardly from its power chamber to receive the compressed mixture therein, ignition is produced by registration of the power cylinder conduits 72 with an ignition port 90 in the closure plate. Ignition may be effected by a glow plug 92 continuously in communication with the ignition port 90. Obviously, any other desired ignition means may be provided as deemed to be necessary or desirable.

Provision is made for controllably rejecting a portion of the compressed fuel mixture with which the power cylinders are to be charged, in order to control the power of the engine. For this purpose, there is provided a compression release or a charge rejecting port or passage 94, disposed in the closure plate, and which passage is disposed at the same radial distance from the axis of rotation as are the fuel delivery conduits 70 of the compressor cylinders. This passage also communicates with the fuel delivery recess or passage 74 whereby when a compressor cylinder has compressed its charge and just before it reaches the by-pass or transfer passage 84, a portion of this charge will be discharged through the transfer passage 94 back to the source of supply, comprising the recess 74. Thus, a portion of the charge received within the compressor cylinder and which has been compressed in readiness for transfer to the power cylinder is educted. The quantity of the rejected charge can be controlled in any desired manner, as by providing a needle valve in the passage 94.

An improved lubricating system is provided for this engine which takes full advantage of the beneficial results of centrifugal forces. Thus, a lubricant supply tank or reservoir 96 is mounted upon the exterior surface of the closure plate 14 as by bolts 98, and communicates with the interior of the casing 10 by a port 100, as shown in Figure 2. This port is so placed as to introduce lubricant about the lower portion of the rim of the rotor, to thus entirely enclose the rim of the rotor in lubricant, and also to supply lubricant to the oil grooves of the pistons as they are exposed below the outer ends of the cylinders. In addition, this supply of lubricant is communicated to the bearing assemblies 64 and 46 in a manner which will be readily understood from an inspection of Figure 2. It should be observed that the effects of centrifugal force cause the lubricant to be distributed evenly over the entire circumference of the rotor, the reaction ring, and the associated parts thereby lubricating and cooling the same effectively. When the engine stops, the lubricant drains to the lower portion and collects in the tank, in the manner shown in Figure 2.

It should also be noted that by virtue of centrifugal forces, the pistons will be retained radially outwardly against the reaction surface 60 of the reaction ring 58. A positive or resilient connection between these parts is therefore unnecessary. Since the cylinder assembly and the pistons which always bear against the reaction assembly, rotate about different axes, a radial inward and outward movement of the pistons will result, and there will be no slippage of the pistons upon the reactor surface since the reactor ring will rotate at the same rate as the pistons. In fact, in some instances, it will be possible to provide a direct connection between the pistons and the reactor ring, if desired.

It will be observed that with this connecting means between the pistons and the power shaft, that there will be one inward and one outward stroke of a piston in its cylinder during one revolution of the rotor. By means of the combination of compressor and power cylinders, one explosion is obtained for each revolution of the power cylinders, and a smooth and even flow of power from the engine is obtained.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A rotary internal combustion engine comprising a stator having a chamber therein, a rotor journaled in said chamber, a reaction member journaled in said chamber and having a circular ring surrounding said rotor, pairs of circumferentially spaced, radially disposed compressor and power cylinders in said rotor, pistons slidable in each cylinder and having their outer ends abutting said circular ring, said ring and said rotor having parallel axes of rotation, said stator having an end wall, means for supplying a combustible mixture to said compressor cylinders, means for transferring compressed combustible mixture from the compressor cylinders to the power cylinders, means for igniting combustible mixtures in the power cylinders, means for discharging exhaust products from the power cylinders each of said means including cooperating passages in said end wall and in said rotor.

2. The combination of claim 1 including by-pass means in said end wall and rotor for by-passing a portion of the compressed combustible mixture from the compressor cylinders to said supply means before transferring the compressed combustible mixture to said power cylinders.

3. The combination of claim 1 including means for mounting a muffler and a source of combustible mixture on the exterior of said end wall, passages through said end wall continuously connecting the muffler and source of mixture to said means for discharging exhaust products and said means for supplying combustible mixture respectively.

4. The combination of claim 1 including a shaft upon which said rotor is fixedly mounted, said casing having an end wall in which said shaft is journaled in cantilever fashion.

5. The combination of claim 1 including a shaft upon which said rotor is fixedly mounted, said casing having an end wall in which said shaft is journaled in cantilever fashion, said last mentioned end wall having a circular shoulder surrounding but eccentric to the axis of said shaft, said reaction member being journaled on said shoulder.

6. The combination of claim 1 including a lubricant reservoir mounted upon the exterior of said end wall, the end wall having a lubricant passage communicating with the reservoir and the chamber at the lower portion of the latter and of the ring whereby to maintain the lower portion of the ring and of the pistons engaged therewith immersed in lubricant.

References Cited in the file of this patent

UNITED STATES PATENTS

| | | |
|---|---|---|
| 686,801 | Box et al. | Nov. 19, 1901 |
| 809,082 | Wright | Jan. 2, 1906 |
| 951,388 | Conill | Mar. 8, 1910 |
| 1,012,201 | Harper | Dec. 19, 1911 |
| 1,109,644 | Redrup et al. | Sept. 1, 1914 |
| 1,293,508 | Moore | Feb. 4, 1919 |
| 1,331,749 | Freer | Feb. 24, 1920 |
| 1,641,960 | Brockway | Sept. 13, 1927 |
| 2,168,502 | Wagers | Aug. 8, 1939 |

FOREIGN PATENTS

| | | |
|---|---|---|
| 17,565 | Great Britain | July 28, 1909 |
| 114,667 | Great Britain | Apr. 15, 1918 |